May 23, 1944. L. FINKELSTEIN 2,349,714
DISPENSING DEVICE FOR PASTES, CREAMS ETC
Filed July 3, 1942
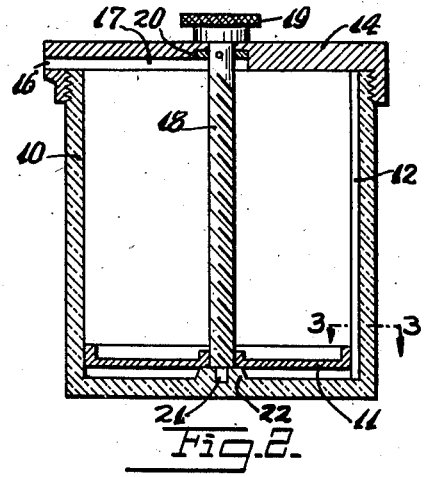
Fig. 2.
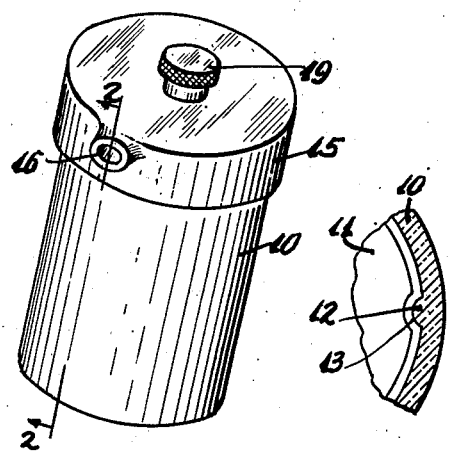
Fig. 1.
Fig. 3.
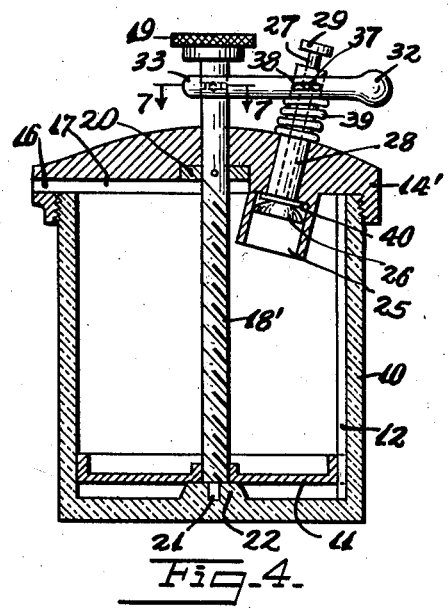
Fig. 4.
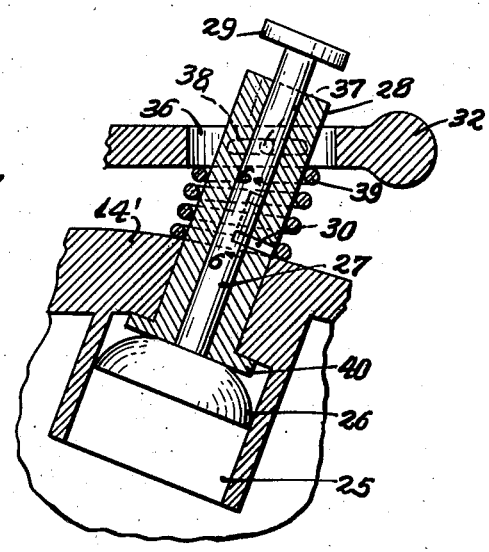
Fig. 5.
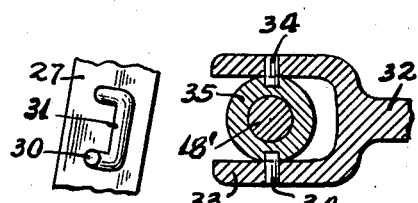
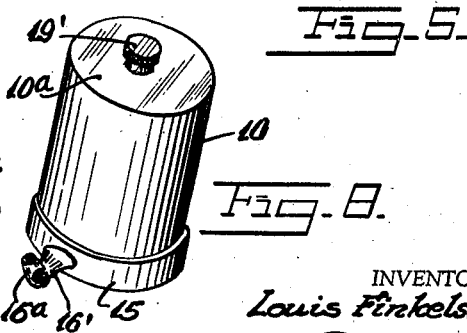
Fig. 6. Fig. 7. Fig. 8.
INVENTOR.
Louis Finkelstein
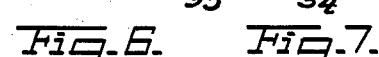
ATTORNEY Patented May 23, 1944

2,349,714

UNITED STATES PATENT OFFICE 2,349,714

DISPENSING DEVICE FOR PASTES, CREAMS, ETC.

Louis Finkelstein, Brooklyn, N. Y.

Application July 3, 1942, Serial No. 449,578

3 Claims. (Cl. 222—256)

This invention relates to new and useful improvements in a dispensing device for pastes and fluids such as tooth paste, shaving cream, etc.

At the present time due to war conditions the available supply of collapsible tubes generally used to hold and dispense tooth pastes, shaving cream, and the like is becoming scarce. This invention contemplates a dispensing container which may be repeatedly refilled and re-used and which may effectively dispense tooth paste, shaving cream, and the like. The new dispensing devices makes no use of tin or other pliable collapsible metals.

The invention contemplates characterizing the dispensing device by a jar for holding the paste or fluid, and a piston within the jar normally adjacent its bottom wall and slidable so that it may be moved upwards and associated with a manually controlled mechanism for moving the piston upwards to dispense the tooth paste, shaving cream or the like, as required.

The invention contemplates providing the jar with a cover having a discharge opening through which the paste or fluids are dispensed.

Still further a novel arrangement of auxiliary piston is proposed by which small controlled amounts of the material may be easily dispensed.

For further comprehension of this invention, and of the objects and advantages thereof, reference will be had to the following description and accompanying drawing, and to the appended claims in which the various novel features of the invention are more particularly set forth.

In the accompanying drawing forming a material part of this disclosure:

Fig. 1 is a perspective view of a dispensing device constructed in accordance with this invention.

Fig. 2 is a vertical sectional view taken on the line 2—2 of Fig. 1.

Fig. 3 is a fragmentary horizontal sectional view taken on the line 3—3 of Fig. 2.

Fig. 4 is a vertical sectional view of a dispensing device constructed in accordance with a modified form of this invention.

Fig. 5 is a fragmentary enlarged detailed view of a portion of Fig. 4 with certain of the parts broken away to disclose interior parts.

Fig. 6 is a fragmentary sectional view taken on the line 6—6 of Fig. 5.

Fig. 7 is a fragmentary sectional view taken on the line 7—7 of Fig. 4.

Fig. 8 is a similar view to Fig. 1 but showing a further modification of the invention.

The dispensing device for pastes and fluids such as tooth paste, shaving cream, etc., in accordance with this invention, includes a jar 10 for holding the tooth paste, shaving cream or the like. A piston 11 is located within the jar 10 and is normally disposed adjacent the bottom wall of the jar and is slidable so that it may be moved upwards.

Means is provided for non-rotatively holding said piston. This means consists of a vertical bead 12 extended along the inner side of the jar 10 and engaging a complementary groove 13 formed upon one side of said piston 11.

The jar 10 is normally closed by a cover 14 which is shown provided with a skirt wall 15 threadedly engaged upon the top of the jar 10. This cover 14 has a discharge 16 at one side. This discharge 16 connects with a groove 17 extended along the bottom face of the cover 14. A screw 18 is rotatively mounted on the cover 14 and extends downwards through the jar 10 and is threadedly connected with the piston 11 for raising the piston.

The screw 18 is arranged coaxially of the jar 10 which is of cylindrical form. The top end of the screw 18 is provided with a knob 19 located upon the outside of the cover 14 by which it may be turned. A washer 20 is fixed upon the screw 18 immediately beneath the bottom face of the cover 14 for rotatively holding the screw 18. This screw has a sharp pitch, as schematically indicated in Fig. 2. The bottom end of the screw 18 has a reduced section 21 which engages into a socket in a boss 22 formed on the bottom wall of the jar 10. The arrangement is such that the cover 14 may be removed and then the reduced end will merely lift away from the boss 22.

The operation of the device is as follows:

The cover 14 may be removed. The piston 11 may then be unscrewed from the screw 18 and dropped into the bottom of the jar 10. The jar 10 may then be filled with tooth paste, shaving cream or the like. The cover 14 is then replaced on the jar 10 and the screw 18 is turned so that its threads threadedly engage the piston 11. Then the knob 19 may be slowly turned as required to cause the piston 11 to move upwards, which indirectly forces out some of the tooth paste or shaving cream through the discharge 16.

In the modified form of the invention illustrated in Figs. 4–7 inclusive, the cover 14' for the dispensing device is provided with a downwardly extending chamber 25 on its bottom face. This chamber extends into the top of the jar 10. An auxiliary piston 26 is located in the top of the chamber 25. Means is provided for manually depressing this auxiliary piston 26 to discharge some of the tooth paste, shaving cream or the like from the jar 10 through the discharge 16.

More specifically, the auxiliary piston 26 is fixedly mounted upon the bottom of a stem 27 which extends through a tube 28 slidably mounted through the cover 14. The outer end of the stem 27 is provided with a head 29 by which the stem may be moved. A pin 30 from the tube 28 engages in a bayonet slot 31 formed in the side of the stem 27 by which the stem 27, and thus the piston 26, may be fixed in a relatively raised or lowered position relative to the tube 28.

A handle 32 is provided with a forked end 33 having a trunnion 34 pivotally engaging a ring 35 rotative on the screw 18'. The handle 32 also is provided with an opening 36 through which the tube 28 projects. A trunnion 37 from the sides of the tube 38 engages elongated slots 38 formed in the sides of the handle 32. An expansion spring 39 acts between the cover 14' and the handle 32 for normally urging the tube 28 outwards. A flange 40 formed on the inner end of the tube 28 engages the top wall of the chamber 25 and limits outward extension of the tube 28.

In other respects this form of the invention is similar to the previous form and like parts are identified by like reference numerals.

The operation of this form of the invention is as follows:

The knob 19 may be turned for causing the piston 11 to move upwards to dispense the tooth paste, shaving cream, etc. or to get ready to dispense these ingredients. Then the handle 32 may be pressed downwards a distance required so that the auxiliary piston 26 will be correspondingly moved which will act against the tooth paste, shaving cream, or the like to actually dispense it through the discharge 16.

After the handle 32 has been fully depressed it is possible to dispense an additional quantity of tooth paste, shaving cream or the like by moving the piston 26 downwards relative to the tube 28. To do this the head 29 is turned so that pin 30 engages the vertical portion of the bayonet slot 31. Then the stem 27 may be moved downwards. The head 29 is again turned to lock the stem 27 in its lowered position. The handle 32 may now be manipulated to dispense additional tooth paste or shaving cream from the jar 10. When no more can be dispensed then the knob 19 must be turned to cause the piston 11 to move upwards and resupply the chamber 25 with tooth paste, etc.

In Fig. 8, the operating knob 19' is shown projecting from the bottom surface 10a of the jar 10, for rotating the screw 18 and the discharge nozzle 16' is shown with a swivel type of spout 16a, for permitting the contents of the jar 10 to be discharged in various directions. In other respects, this form of the invention is similar to the previous forms.

It is to be understood that the jar 10 may be cylindrical, conical, or of any other desired shape.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A dispensing device for pastes and fluids, comprising a jar of the paste or fluid, a piston within said jar adjacent its bottom wall and slidable so it may be moved upwards, means for non-rotatively holding said piston, a cover for said jar having a discharge opening at one side, and a screw rotatively mounted on said cover and extending downwards through said jar, threadedly connected with said piston for raising said piston, a downwardly extending chamber on the bottom face of said cover, an auxiliary piston in the top of said chamber, and means for manually depressing said auxiliary piston comprising a tube slidably mounted through said cover, a stem extending through said tube and supporting said auxiliary piston, a handle pivotally connected with a ring rotative about said screw, said handle being provided with an opening through which said tube passes, a trunnion on said tube engaging slots in said handle, and resilient means urging said tube outwards.

2. A dispensing device for pastes and fluids, comprising a jar of the paste or fluid, a piston within said jar adjacent its bottom wall and slidable so it may be moved upwards, means for non-rotatively holding said piston, a cover for said jar having a discharge opening at one side, and a screw rotatively mounted on said cover and extending downwards through said jar and threadedly connected with said piston for raising said piston, a downwardly extending chamber on the bottom face of said cover, an auxiliary piston in the top of said chamber, and means for manually depressing said auxiliary piston comprising a tube slidably mounted through said cover, a stem extending through said tube and supporting said auxiliary piston, a handle pivotally connected with a ring rotative about said screw, said handle being provided with an opening through which said tube passes, a trunnion on said tube engaging slots in said handle, and resilient means urging said tube outwards, and a pin and bayonet slot on said tube and stem, respectively, for holding these parts in selected relative positions.

3. A dispensing device for pastes and fluids, comprising a jar for the paste or fluid, a piston non-rotatively but vertically slidably disposed within said jar and adjacent the bottom wall thereof when the jar is filled, a cover for said jar having a discharge opening at one side, a screw rotatively mounted on said cover and extending downwards through said jar and threadedly connected with said piston for raising said piston when turned, a downwardly extending chamber formed on the bottom face of said cover, an auxiliary piston in the top of said chamber, a tube from said piston extended through said cover to the outside thereof, an expansion spring on said tube operating between the top face of said cover and a stationary portion of said tube for urging said tube into a raised position in which said auxiliary piston will be located in the top portion of said chamber, and means facilitating urging said tube manually inwards against the action of said spring to move said auxiliary piston downwards in said chamber and discharge said material in said jar through said discharge opening.

LOUIS FINKELSTEIN.